United States Patent [19]

Kao

[11] Patent Number: 5,770,938
[45] Date of Patent: Jun. 23, 1998

[54] REAL TIME CHARGING CONTROL OF A FAST BATTERY CHARGER

[75] Inventor: Hsueh-Wu Kao, Hsinchu, Taiwan

[73] Assignee: Industrial Technology Research Institute, Hsin-chu, Taiwan

[21] Appl. No.: 762,485

[22] Filed: Dec. 9, 1996

[51] Int. Cl.⁶ .................................. H02J 7/02; H02J 7/16
[52] U.S. Cl. ............................................. 320/148; 320/161
[58] Field of Search ................................. 320/39, 40, 30, 320/31, 20, 148, 161; 324/429

[56] References Cited

U.S. PATENT DOCUMENTS

| | | | |
|---|---|---|---|
| 4,388,582 | 6/1983 | Saar et al. | 320/20 |
| 4,392,101 | 7/1983 | Saar et al. | 320/20 |
| 4,418,310 | 11/1983 | Bolliger | 320/39 |
| 4,742,290 | 5/1988 | Sutphin et al. | 320/21 |
| 4,746,852 | 5/1988 | Martin | 320/39 X |
| 5,113,128 | 5/1992 | Ohara et al. | 320/21 |
| 5,225,763 | 7/1993 | Krohn et al. | 320/39 X |
| 5,268,630 | 12/1993 | Bhagwat et al. | 320/20 |
| 5,304,916 | 4/1994 | Le et al. | 320/39 X |
| 5,315,253 | 5/1994 | Alexandres et al. | 324/429 |
| 5,432,426 | 7/1995 | Yoshida | 320/20 |
| 5,449,997 | 9/1995 | Gilmore et al. | 320/39 |
| 5,557,190 | 9/1996 | Brotto | 320/148 |
| 5,612,607 | 3/1997 | Nicolai | 320/148 |
| 5,621,302 | 4/1997 | Shinohara | 320/39 X |

*Primary Examiner*—Peter S. Wong
*Assistant Examiner*—K. Shin
*Attorney, Agent, or Firm*—George O. Saile; Stephen B. Ackerman

[57] ABSTRACT

Methods and circuits are disclosed which terminate charging of a battery when the maximum charge is reached. Maximum charge is reached when the battery voltage has peaked, after a long rise, and just starts to drop. This small voltage drop, or delta, is detected by a charger control which compares the real time battery voltage with a previously sampled battery voltage. Upon detecting this small voltage drop, the charger control terminates the charging process. Implementations using an analog delta voltage detection and a digital delta voltage detection are described.

8 Claims, 6 Drawing Sheets

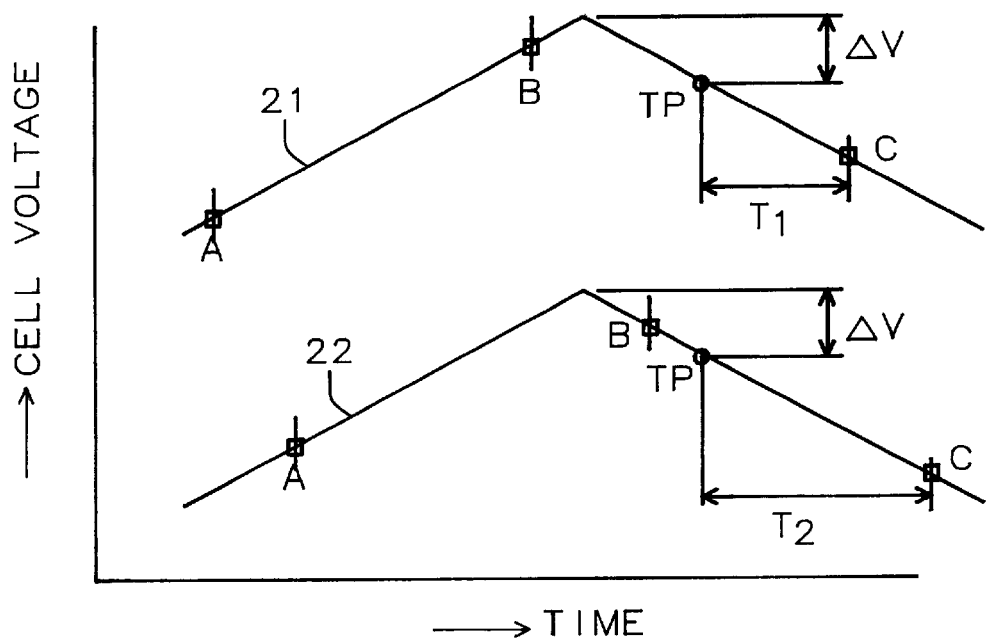
FIG. 2 - Prior Art
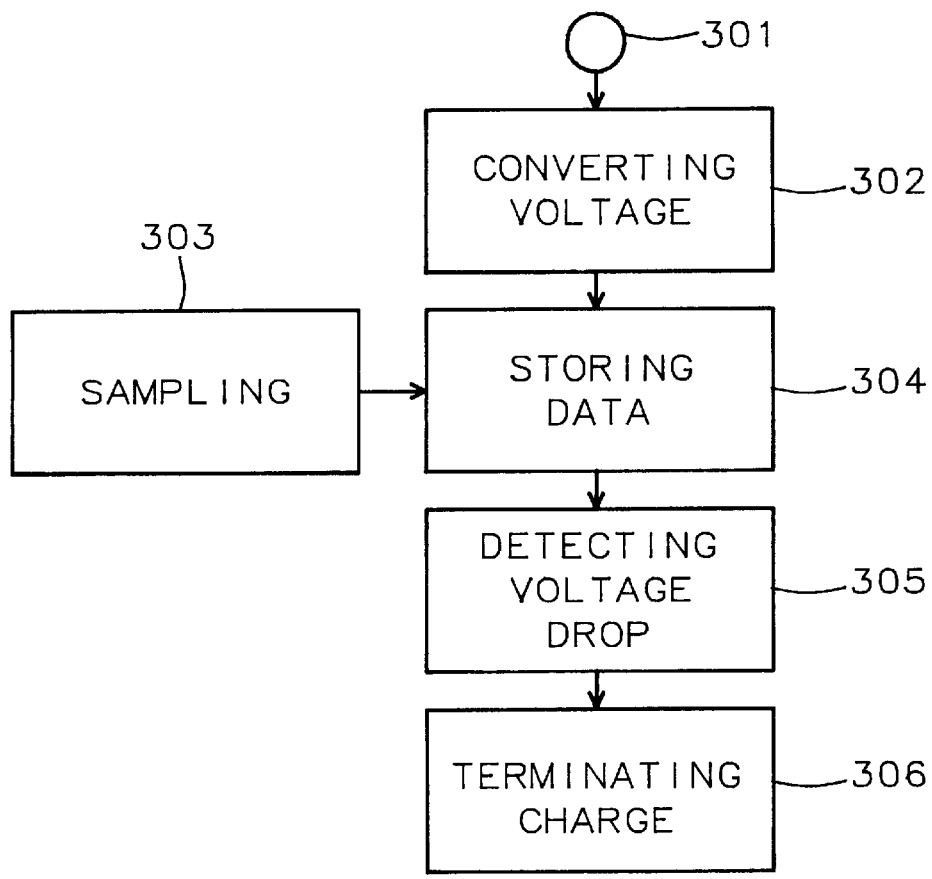
FIG. 3

REAL TIME CHARGING CONTROL OF A FAST BATTERY CHARGER

BACKGROUND Of THE INVENTION

1. Field of the Invention

This invention relates to methods and circuits to terminate charging of a battery when the peak charge has been reached by monitoring the battery voltage.

2. Description of the Prior Art

Modern battery chargers recharge chargeable batteries in very little time using very high charging currents. To protect from overcharging and damage to the batteries, and yet guarantee that batteries get maximum charge, it is very important to terminate charging at the point of maximum charge. Methods to end charging of the battery, known in the art, such as monitoring the temperature of the battery, voltage cutoff, or limiting the time of charging have turned out to be unreliable.

Reliable methods known in the art have been disclosed which monitor the slope of the voltage curve for a particular battery type. Curve 11 of FIG. 1a is the voltage characteristic of a nickel-cadmium (Ni—Cd) battery charging cycle. Points A, B, and C are the inflection points of the curve and roman numerals (I through V) designate the sections adjacent or in-between. Point C is the point of maximum charge and voltage. U.S. Pat. Nos. 4,388,582 and 4,392,101 (both by Saar et al. ) analyze the battery voltage profile, noting inflection points A and B on the battery voltage versus time graph. These patents also include analysis of voltage slope and a negative change in the level of charge. However, because the sampling rate is fixed, charging of the battery could continue for a short time and go beyond the safe point.

U.S. Pat. No. 5,268,630 (Bhagwat et al.) shows a method and apparatus for rapidly charging a battery by monitoring the voltage and changing of the effective sampling rate when going from region II to region III. Full charging stops at inflection point B and trickle charge takes over from there. Because the voltage is sampled, stored and then compared, this method is not a real time system. U.S. Pat. No. 5,268,630 (Gilmore et al.) discloses a similar method and apparatus at a uniform sampling rate. Full charging stops at point B and trickle charging continues from there on.

U.S. Pat. No. 5,315,253 (Alexandres et al.) samples the battery voltage every 4 seconds, but the termination of charging is not mentioned. U.S. Pat. No. 5,432,426 (Yoshida) discloses an invention where a control section detects and stores the battery voltage in one minute intervals and calculates a most recent and an average gradient. When comparison of these gradients indicates that region III has been entered, the control section starts comparing the present voltage with the previous voltage. When equal or less, the peak voltage is reached and charging is terminated.

SUMMARY OF THE INVENTION

It is an object of the present invention to provide methods and circuits to terminate charging of a battery when the maximum charge has been reached.

A further object of the present invention is to provide methods and circuits to detect when the battery voltage has peaked and just starts to drop.

These objects have been achieved by providing a choice of either an analog or a digital real time charger control which continuously compares the current battery voltage with a previously sampled battery voltage. When a certain voltage drop is detected, the charger control terminates the charging process.

BRIEF DESCRIPTION OF THE DRAWINGS

FIG. 2 is a graph showing prior art voltage sampling of a charged Ni—Cd cell.

FIG. 3 is a block diagram illustrating the principle of the method of the present invention.

DESCRIPTION OF THE PREFERRED EMBODIMENTS

Figure 1A:
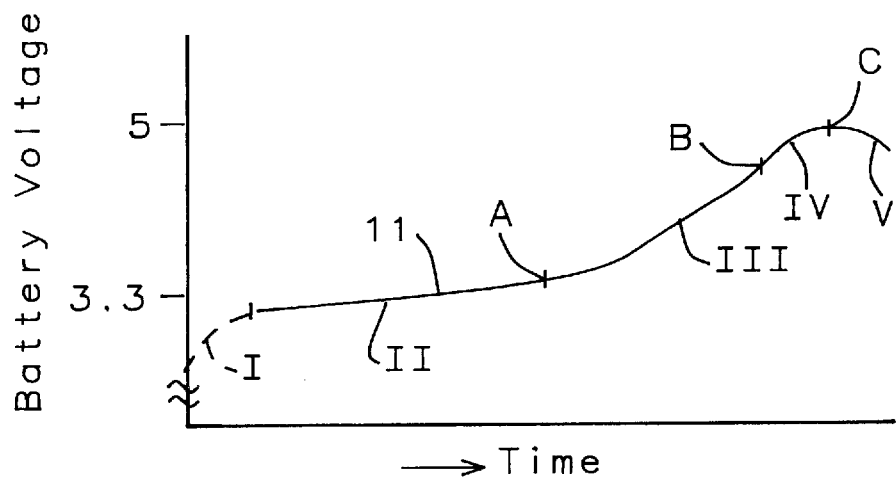
FIG. 1a and 1b are graphs of the charge voltage characteristics of nickel-cadmium cells.
Figure 1B:
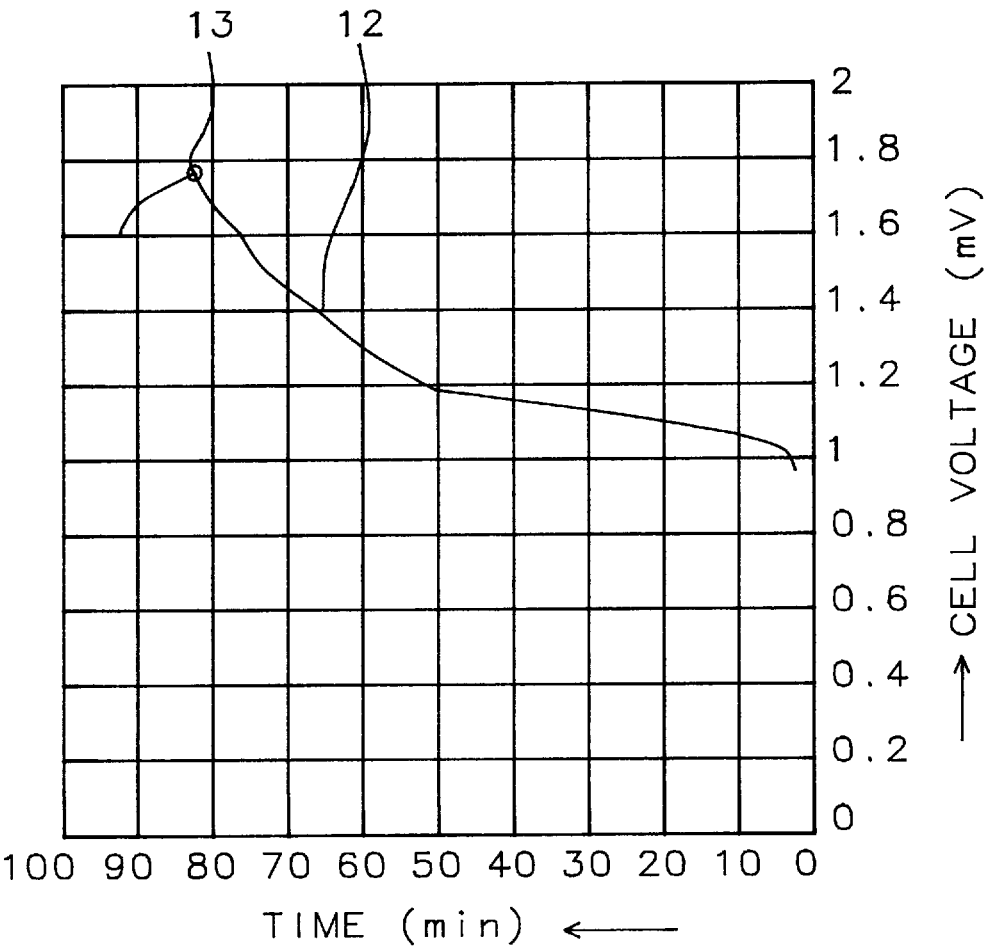

Curve 12 of FIG. 1b is the voltage characteristic of a nickel-cadmium (Ni—Cd) battery (cell), charged by a constant current, and as recorded by a plotter. When the Ni—Cd cell is fully charged, as indicated by voltage peak 13, there will be a cell voltage drop ($-\Delta V$) as seen to the left of voltage peak 13. The $-\Delta V$ of the Ni—Cd cell can be as small as 4–6 mVolts per cell. A smart battery charge controller uses this $-\Delta V$ to detect the point of full charge. Once this point is reached, the controller must be able to immediately turn off the charging current to protect the cell from being overcharged, since overcharging may degrade or even destroy the battery.

Fixed sampling rates do not allow real time monitoring of a battery voltage. Additionally, either the sampling rate is too low (too far apart) and the optimal termination of charging is missed or the sampling rate is too frequent and the voltage drop between two successive samples is smaller than the critical $-\Delta V$ and charging might not be terminated in time. Curves 21 and 22 of FIG. 2 are stylized voltage peaks of the charge curve and demonstrate when the sampling rate is too low. Charging of the battery should stop at point TP since it is $\Delta V$ below the peak. Charging, however, continues for either time $T_1$ or $T_2$ depending on where the sample points A, B, and C fall on the curve.

This present invention differs from the prior art in that it allows fast charging up to the maximum charge capacity of the battery in question without overcharging it. The invention terminates charging by detecting the small drop in battery voltage that occurs immediately following maximum charge. None of the inventions of prior art offer this combination.

This invention provides methods and circuits for real time monitoring of the voltage of a battery by continuously comparing the most recent battery voltage with a battery voltage sampled and stored a short while before. Two embodiments for real time monitoring of the charging of a battery are described: The first embodiment uses an analog $\Delta V$ control and the second embodiment uses a digital $\Delta V$ control.

FIG. 3 is a block diagram which illustrates the principle of the present invention, which is to terminate charging of a battery when it has reached its maximum charge. An indication of maximum charge is when the battery voltage peaks after a long rise and then drops. The method is then to convert the battery voltage 301 into digital data, Block 302, and store the data in a register, Block 304. In Block 305 the voltage drop is detected by comparing the last stored peak voltage with the real time battery voltage. When a voltage drop of a certain $\Delta V$ is detected, charging of the battery is terminated, Block 306. Real time sampling, indicated by Block 303, is necessary to insure that the $\Delta V$ is recognized promptly so as to not overcharge the battery.

Figure 4:
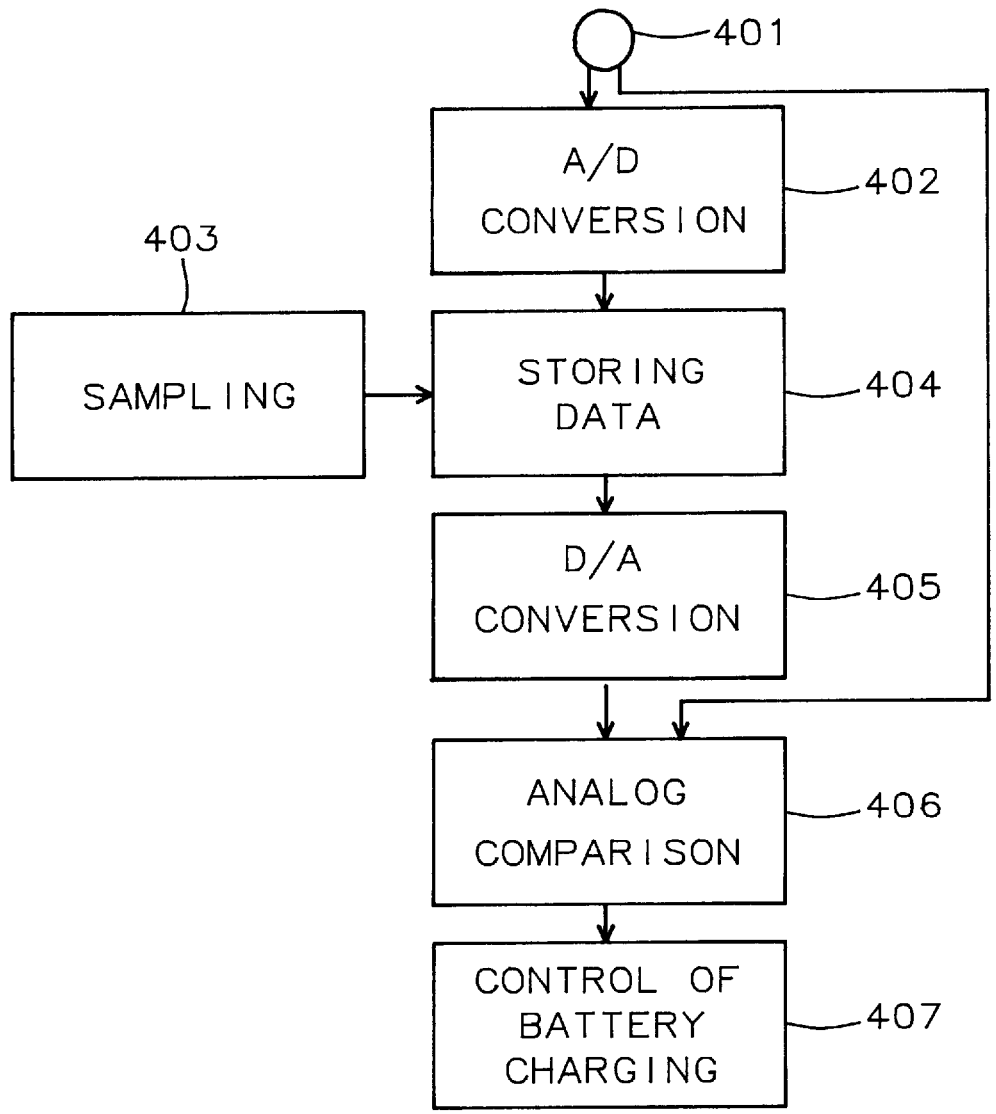
FIG. 4 is a block diagram of the analog method of the present invention.

FIG. 4 is a block diagram showing the analog control method, according to the first embodiment of the present invention, where charging of a battery must be terminated when that battery has reached a peak charge. Battery voltage of Block 401 is applied to Block 402, where the battery voltage is converted from analog into digital data. Block 403 is a sample clock which strobes the digital data into a register, where it is latched up (Block 404). In Block 405 the output of the register is then converted back into an analog signal. The analog comparator of Block 406 next makes a comparison between the battery voltage of Block 401 and the output of Block 405. (The analog signal represents an earlier battery voltage since it got latched up in the register.) The result of the comparison now goes to Block 407, the logic which controls the charging of the battery.

Charging of the battery is terminated when the comparison indicates that the battery voltage is less than the analog signal by a fixed and predetermined amount. This method converts an analog battery signal to digital data, where the digital data represents the battery voltage as measured in real time.

The advantage of the method of A/D and subsequent D/A conversion is that the sampled battery voltage is preserved in the register. This is like a Sample and Hold function that holds the data for as long as is desired, something an analog S/H function cannot do because of capacitor leakage. This method therefore preserves in analog form, at the output of Block 405, an earlier sampled battery voltage without degradation of that voltage over time.

The analog comparator thus provides real time and continuous comparison between the current battery voltage and the last battery voltage (latched up in the register). The use of an A/D and D/A converter would imply additional chip real estate, but through the use of the method of successive approximation both A/D and D/A converters share the same circuits. By not requiring a digital comparator, total chip real estate is not increased.

Figure 5:
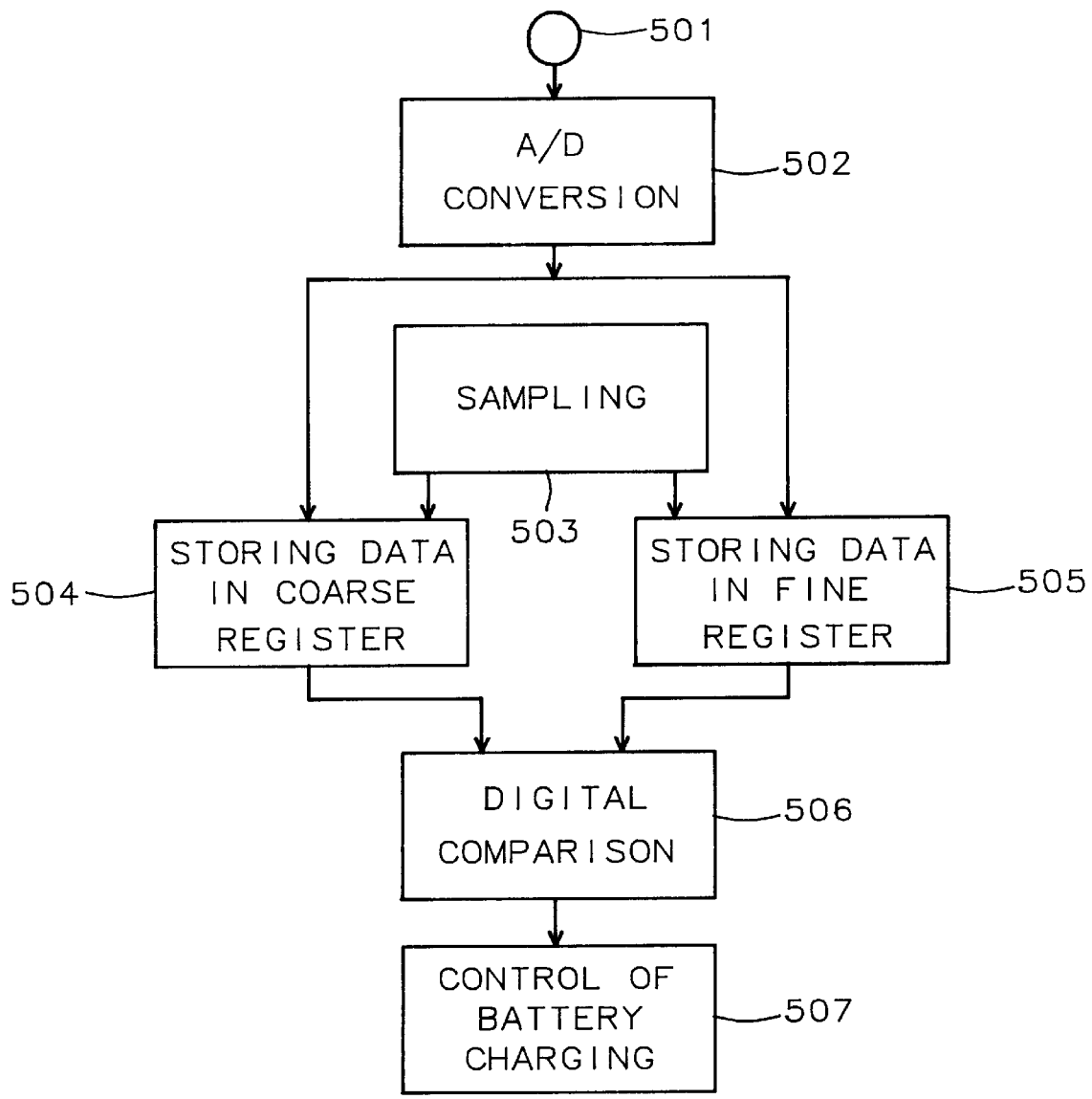
FIG. 5 is a block diagram of the digital method of the present invention.

FIG. 5 of the present invention is a block diagram showing the digital control method, according to the second embodiment of the invention, where charging of a battery must be terminated when that battery has reached a peak charge.

Battery voltage of Block 501 is applied to Block 502, where the battery voltage is converted from analog into digital data by an analog-to-digital converter. Block 503 is a sample clock which strobes the digital data into the coarse register (Block 504) and into the fine register (Block 505). This sample clock has two different outputs, where each output has a different rate with which it strobes data into the registers.

Data into the coarse register is latched using a slower or coarse sampling rate, to store a less recent sample (A, B, C) of the battery voltage. Data into the fine register is latched using a faster or fine sampling rate, to store a more recent sample (1 to 16) of the battery voltage. Thus, points 1 through 8 are compared with point A, and points 9 through 16 are compared with point B. Data from the coarse and fine registers is compared in a digital comparator, Block 506, to detect the difference between the battery voltage of the less recent sample (Block 104) and the more recent sample (Block 505). The result of the comparison is then signaled to Block 507, the logic which controls when charging of the battery is to be terminated.

This method converts an analog battery signal to digital data, where the digital data represents the battery voltage as measured in real time. The advantage of the method of A/D conversion is that the two registers, Blocks 504 and 505, can store the battery voltage without degradation of the data over time.

By using the method of repeatedly comparing, in Block 506, the most recent digital data in the fine register with the less recent data in the coarse register, the difference between those two registers is measured. This measurement is the difference between an earlier battery voltage and the current battery voltage. When this voltage difference, or $\Delta V$, is negative, it implies that the peak charge has been reached and the battery voltage is going down. Charging of the battery is then terminated by the control logic of Block 507.

Figure 6A:
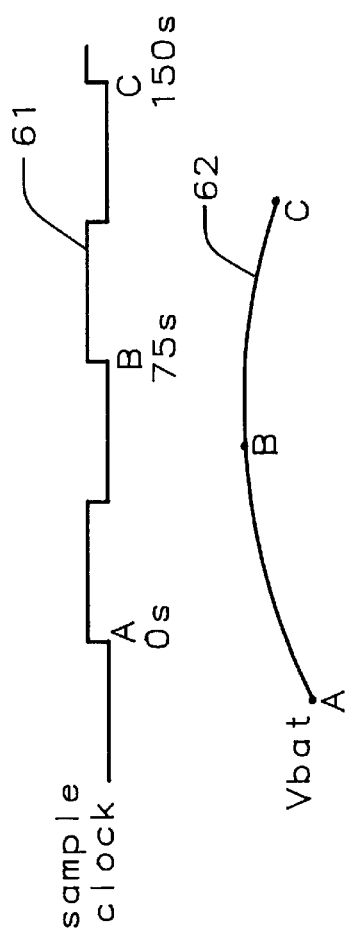
FIG. 6a is a view of the input and strobing signal of the block schematic as shown in FIG. 6b.
Figure 6B:
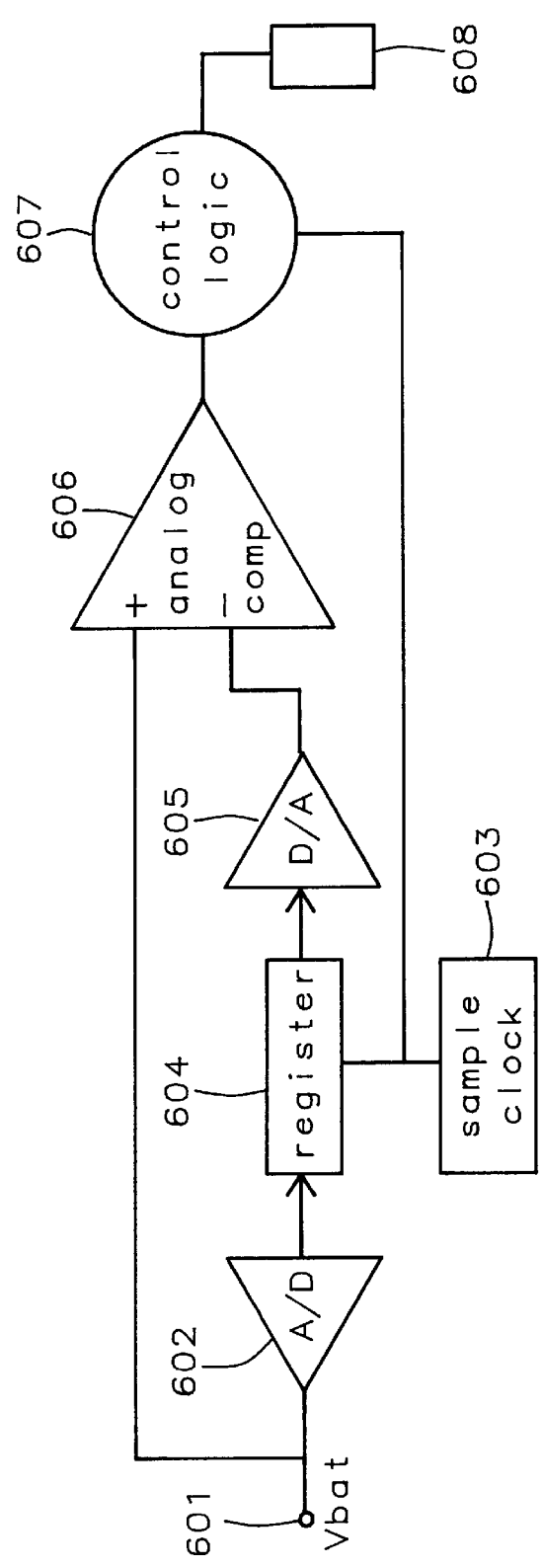
FIG. 6b is a block schematic of the analog circuit of the present invention.

FIG. 6a and FIG. 6b are depictions of the signal waveshapes and block schematic of the analog control method, according to the first embodiment of the present invention. Referring now to FIG. 6a, CURVE 61 shows the coarse sampling waveform, points A, B, and C are the sample points shown to be (by way of example and not limiting the scope of the invention) 75 seconds apart. This rate may vary from 5 to 100 seconds, depending on the charge current. CURVE 62 depicts the battery voltage peak with sample points A, B, and C marked.

Referring to FIG. 6b, a circuit is now described which detects when a battery has reached its peak charge and charging must be terminated. Battery voltage is applied to input 601 which is connected to an analog-to-digital converter 602. A digital sample clock 603 provides the strobe for register 604, which latches up and stores the battery voltage. The output of the register is once more converted to analog form by the digital-to-analog converter 605. An analog comparator 606 compares the current battery voltage from input 601 with the sampled and stored battery voltage in register 604.

The output voltage of the analog comparator 606 is the difference between the input voltages. If that $\Delta V$ is negative, it implies that the peak charge has been reached and the battery voltage is going down. Based on the analog output of comparator 606, control logic 607 determines that there had been a voltage drop equal to $-\Delta V$ and terminates charging of the battery. The analog-to-digital converter provides a resolution of the input signal of 0.6 mVolts, but a satisfactory resolution can be in the range of 0.6 to 2.4 mVolts. To match the A/D resolution, register 604 has a data width of 12 bits, but it may range from 10 to 12 bits, commensurate with the above A/D resolution range. The control logic 607 terminates charging of the battery 608 when the control logic determines that the difference in voltage, or $\Delta V$, is negative, and its magnitude is equal to or larger than 4 to 6 mVolts.

Noise or an intermittent drop in the battery voltage, at input terminal 601, can be prevented from reaching the control logic, and prematurely terminating the charge cycle, by adding a Smith trigger and debounce logic to the circuit just described.

Figure 7A:
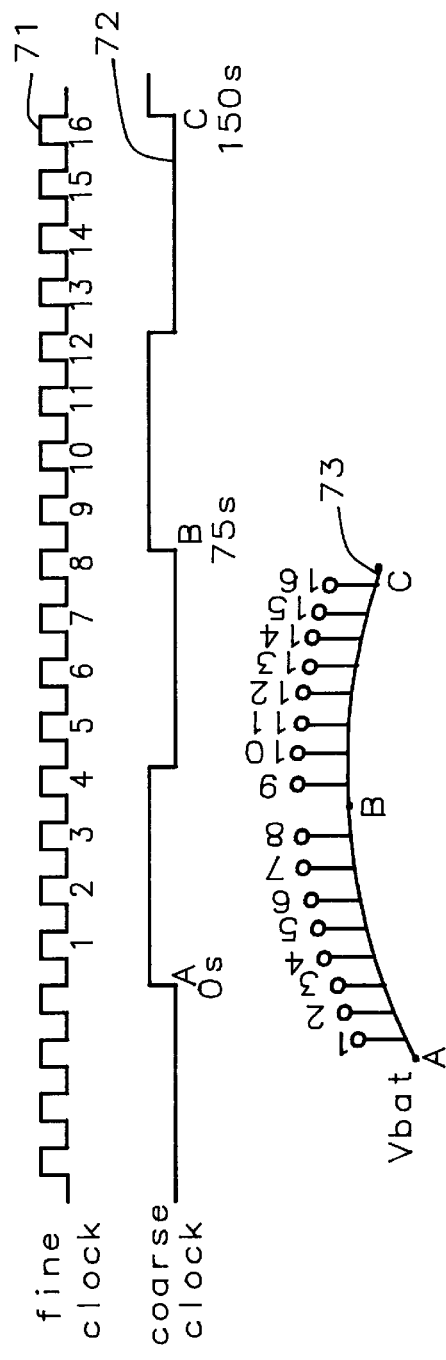
FIG. 7a is a view of the input and strobing signals of the block schematic as shown in FIG. 7b.
Figure 7B:
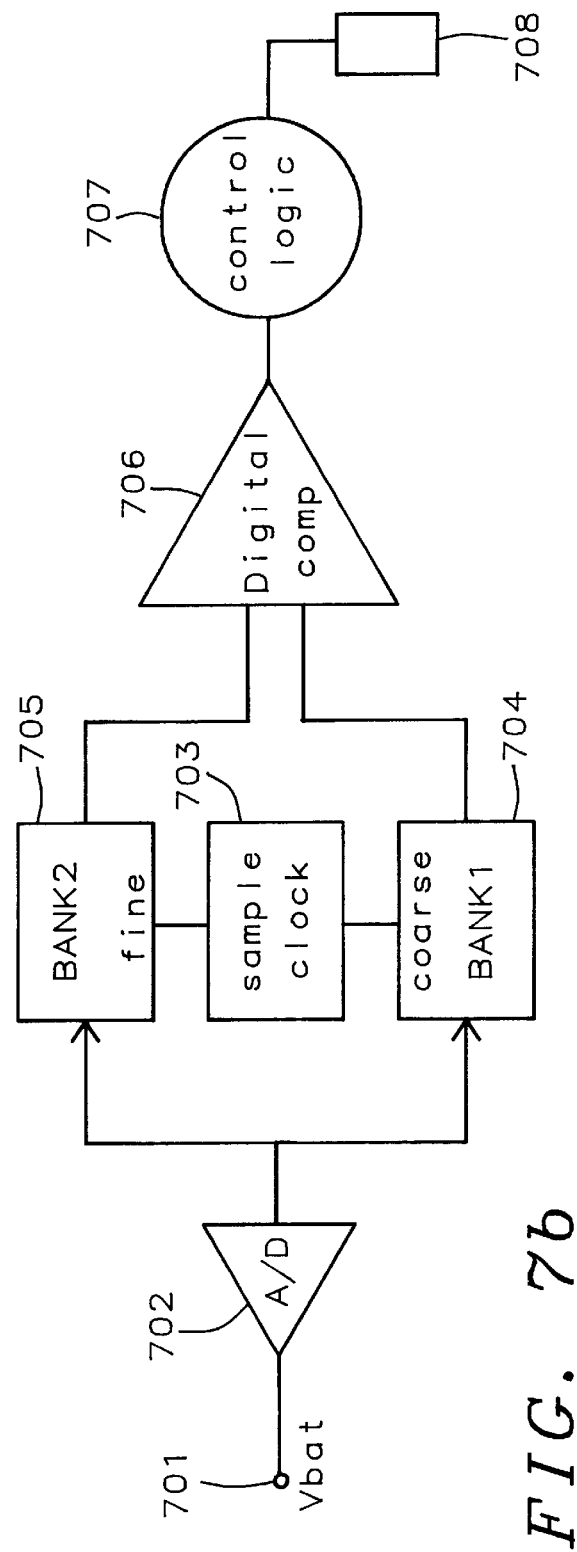
FIG. 7b is a block schematic of the digital circuit of the present invention.

FIG. 7a and FIG. 7b are depictions of the signal waveshapes and block schematic of the digital control method, according to the second embodiment of the present invention. Referring now to FIG. 7a, CURVE 71 shows the fine sampling waveform, and CURVE 72 shows the coarse sampling waveform. Points A, B, and C on CURVE 72 are the coarse sample points shown to be (by way of example and not limiting the scope of the invention) 75 seconds apart. This rate may vary from 5 to 100 seconds.

CURVE 73 depicts the battery voltage peak with coarse sample points A, B, and C marked. In between are the fine sample points, marked 1 to 16. There are eight fine sample points each, between points A and B, and B and C. Eight fine sample points are shown by way of example and are not meant to limit the scope of the invention. The fine sample points may range, in integer multiples, from 4 to 32.

Referring to FIG. 7b, a circuit is now described which detects when a battery has reached its peak charge and charging must be terminated. Battery voltage is applied to input 701 which is connected to an analog-to-digital converter 702. A digital sample clock 703 provides the fine sample strobe, CURVE 71, and the coarse sample strobe, CURVE 72. The positive going transition of fine strobe 1 is offset by 180 degrees relative to the positive going transition of coarse pulse A, so that pulse A and pulse 1 do not coincide in time. This is true for pulse B and pulse 9 and for all successive pulses.

Register 704 (BANK1), latches up and stores data at the coarse strobe. Register 705 (BANK2), latches up and stores data at the fine strobe. The Outputs of registers 704 and 705 feed digital comparator 706. The output of comparator 706 provides the difference between the data at its inputs. Control logic 707, connected to digital comparator 706, terminates the charging of battery 708 when it determines that data at the output of comparator 706 has a value equal to, or larger than $-\Delta V$. $\Delta V$ is the fixed and predetermined amount of voltage by which the battery voltage can drop without doing damage to the battery 708 being charged.

The dual-slope analog-to-digital converter 702, provides a resolution of the battery voltage of 0.3 mVolts, which is deemed satisfactory. But the resolution could range from 0.0375 to 0.6 mVolts. To match the A/D resolution, register 704 and 705 have a data width of 13 bits, but it may range from 12 to 16 bits, or even higher, commensurate with the above A/D resolution range. The control logic 707 terminates charging of the battery 708 when the control logic determines that the difference in voltage, or 66 V, is negative, and its magnitude is equal to or larger than 4 to 6 mVolts.

Noise or an intermittent drop in the battery voltage, at input terminal 701, can be averaged, and thus cancelled, through the use of the dual-slope analog-to-digital converter 702. The noise or intermittent voltage drop is thus prevented from reaching the control logic and causing premature termination of the charge cycle.

While the invention has been particularly shown and described with reference to the preferred embodiments thereof, it will be understood by those skilled in the art that various changes in form and details may be made without departing from the spirit and scope of the invention.

What is claimed is:

1. A circuit for detecting when a battery has reached its peak charge and charging must be terminated, comprising:
    an analog-to-digital converter with a first input and first output, said analog-to-digital converter changing an analog signal into a digital data;
    a digital clocking means with a second and third output, said digital clocking means providing a coarse strobe at said second output and a fine strobe at said third output for latching up data at periodic intervals;
    a first register with a second and third input and a fourth output, said second input connected to said first output and said third input connected to said second output, said register latching up and storing digital data;
    a second register with a fourth and fifth input and a fifth output, said fourth input connected to said first output and said fifth input connected to said third output, said register latching up and storing digital data;
    a digital comparator with a sixth and seventh input and a sixth output, said sixth input connected to said fourth output and said seventh input connected to said fifth output, said digital comparator providing at said sixth output the difference in voltage between said sixth and seventh input, said difference in voltage being negative when the magnitude of said seventh input is less than that of said sixth input;
    a control logic with an eighth input and a seventh output, said eighth input connected to said sixth output, said control logic terminating said charging of said battery when said control logic determines that said difference in voltage exceeds a fixed and predetermined amount, and
    a battery with a ninth input, said ninth input connected to said first input and said seventh output, said battery being able to accept and deliver electrical charge at said ninth input,
    wherein a positive going transition of said fine strobe is offset by 180 degrees relative to a positive going transition of said coarse strobe, so that positive transitions of said fine and coarse pulses do not coincide in time.

2. The circuit of claim 1, wherein said analog-to-digital converter provides a resolution of said first input signal in the range of 0.0375 to 0.6 mVolts.

3. The circuit of claim 1, wherein said coarse strobe of said digital clocking means has a period in the range of 5 to 100 seconds.

4. The circuit of claim 1, wherein said fine strobe of said digital clocking means is an integer multiple of said coarse strobe, ranging from 4 to 32.

5. The circuit of claim 1, wherein said first register has a data width in the range of 12 to 16 bits.

6. The circuit of claim 1, wherein said second register has a data width in the range of 12 to 16 bits.

7. The circuit of claim 1, wherein said control logic terminates charging of said battery when said control logic determines that said difference in voltage is negative, and its magnitude is equal or larger than 4 mVolts.

8. The circuit of claim 1, wherein said analog-to-digital converter is a dual-slope analog-to-digital converter.

* * * * *